United States Patent [19]

Chadwick et al.

[11] Patent Number: 5,293,780
[45] Date of Patent: Mar. 15, 1994

[54] HEAD-GAUGE/TANK-BLADDER

[76] Inventors: Harold D. Chadwick, P.O. Box 8; William Kingsley, P.O. Box 4, both of Keene, N. Dak. 58847

[21] Appl. No.: 871,737

[22] Filed: Apr. 21, 1992

[51] Int. Cl.⁵ ............................ G01L 7/02; G01L 7/10
[52] U.S. Cl. ........................................ 73/706; 73/731; 73/756
[58] Field of Search ............... 73/299, 301, 706, 715, 73/729, 756, 731

[56] References Cited

U.S. PATENT DOCUMENTS

| 1,828,093 | 10/1931 | Ailman | 73/706 |
|---|---|---|---|
| 3,648,687 | 3/1972 | Ramsey, III | 128/2.05 D |
| 4,466,290 | 8/1984 | Frick | 73/756 |
| 4,686,764 | 8/1987 | Adams et al. | 29/592 |
| 4,722,228 | 2/1988 | Awa et al. | 73/706 |
| 4,732,042 | 3/1988 | Adams | 73/706 |
| 4,735,090 | 4/1988 | Jeffrey et al. | 73/706 |
| 4,829,825 | 5/1989 | Lawford | 73/706 |
| 4,833,922 | 5/1989 | Frick et al. | 73/756 |
| 4,841,776 | 6/1989 | Kawachi et al. | 73/706 |
| 4,866,989 | 9/1989 | Lawless | 73/756 |
| 4,934,193 | 6/1990 | Hayata | 73/727 |
| 4,993,265 | 2/1991 | Koen et al. | 73/706 |

Primary Examiner—Richard E. Chilcot, Jr.
Assistant Examiner—Joseph L. Felber

[57] ABSTRACT

A head-gauge/tank-bladder device for measuring the pressure of liquid within a tank. The invention provides for measuring the tank pressure while maintaining the gauge isolated form the liquid within the tank. The invention is connects a gauge to a fluid filled tank through at least one threaded connection. On the other end of the tube, a bladder is attached. A liquid contained within the tubing transmits the tank fluid pressure to the gauge.

18 Claims, 2 Drawing Sheets

HEAD-GAUGE/TANK-BLADDER

FIELD OF THE INVENTION

The present invention relates to a device to attach a gauge to a tank holding saltwater, crude oil or other liquids to prevent freezing or build-up of material on the gauge apparatus which could cause the gauge to give inaccurate readings.

BACKGROUND OF THE INVENTION

Storage tanks are used to hold a variety of liquids. Because the tanks are totally closed, conditions inside the tank, such as the liquid level is not readily apparent or easily ascertained. The liquid level may be measured by inserting a dip stick into the tank.

Gauges are often inserted into tanks holding various materials to measure various conditions within the tank such as the volume of liquid remaining in the tank. Problems arise because the liquid contained within the tank can adversely affect the gauge in a number of ways. Material such as crude oil or salt water can clog, or freeze the gauge or cause the gauge to deteriorate resulting in the gauge producing inaccurate readings.

In an attempt to solve the problems associated with gauge deterioration and clogging, devices which isolate the gauge from the liquid were designed which place a second liquid between the liquid in the tank and the gauge. Such devices include a surface or bladder on which the liquid acts. The surface contains the second liquid within an enclosed space. The surface then transmits the pressure to the second liquid which in turn acts on the gauge.

These isolating devices prevent the fouling and corrosion of the gauge. However, such gauge isolating devices require attachment to the inside of the tank thereby requiring full drainage of the tank and requiring personnel to enter the tank. Furthermore, the conditions inside the tank can be inhospitable to a person attempting to enter for measuring purposes. Moreover, additional problems have been encountered in the operation and installation of the isolating device when operating a gauge with an isolation device in cold climates, since the liquid within the device tends to freeze.

SUMMARY OF THE INVENTION

The present invention overcomes the shortcomings existing in the prior art.

Among the objects of the present invention is to provide a device to allow a gauge to accurately measure conditions within a liquid or gas filled tank by isolating the gauge from the liquid to be measured.

Another object of the present invention is to provide a device to prevent a gauge from being fouled up by the contents of the tank.

A further object of the present invention is to provide a device which measures the pressure/level of liquid within a tank and which can be connected to a tank from the outside, eliminating the need for personnel to enter the tank.

A still further object of the present invention is to provide a device which is unaffected by freezing temperatures.

The above and other advantages of the present invention are achieved by the structure as described below.

The present invention provides a head-gauge to measure the pressure and level of a fluid within a tank. The gauge is connected to a flange with a hole. The flange is in turn connected to a first nipple.

A second nipple is inserted into and connected to the free end of the first nipple. The free end of the second nipple is then connected to a bladder. The tube assembly is then introduced into the tank, through a hole formed towards or in the vicinity of the bottom of the tank with the flange remaining outside the tank.

A fixture mounted around the hole in the tank provides a connection for the flange. For example, the fixture can provide a surface which partially overlaps the surface of the flange allowing bolts to be inserted through the holes in the flange then through holes in the fixture. Nuts attached to the bolts secure the flange to the fixture. The attachment of the present invention is accomplished from the outside of the tank.

Into the lengths of tube, a liquid, which can contain compound not subject to freezing (e.g. an anti-freeze solution), is introduced. Pressure from the liquid in the tank deforms the bladder, thereby displacing the liquid within the bladder and nipples, causing it to impact on the gauge. The gauge then provides an accurate indicator of tank pressure and thereby, fluid level within the tank. A passage formed within the flange or nipple allows for the escape of air from the device from the tubular sections. Fluid is introduced through an opening on the head-gauge.

By isolating the gauge from the liquid within the tank, the present invention prevents elements within the liquid from clogging the gauge apparatus. The present invention accomplishes its objects with a very simple design using inexpensive and readily available materials.

BRIEF DESCRIPTION OF THE DRAWINGS

The objects of the present invention are shown in the accompanying drawings, in which:

FIG. 3 represents a cross-sectional view of the present invention in relation to the tank it is connected to;

DETAILED DESCRIPTION OF THE PREFERRED EMBODIMENT(S)

The present invention device comprises a liquid filled tube to be placed between a gauge and the liquid within a tank to allow for measuring of the pressure and fluid level within the tank 60.

Figure 1:
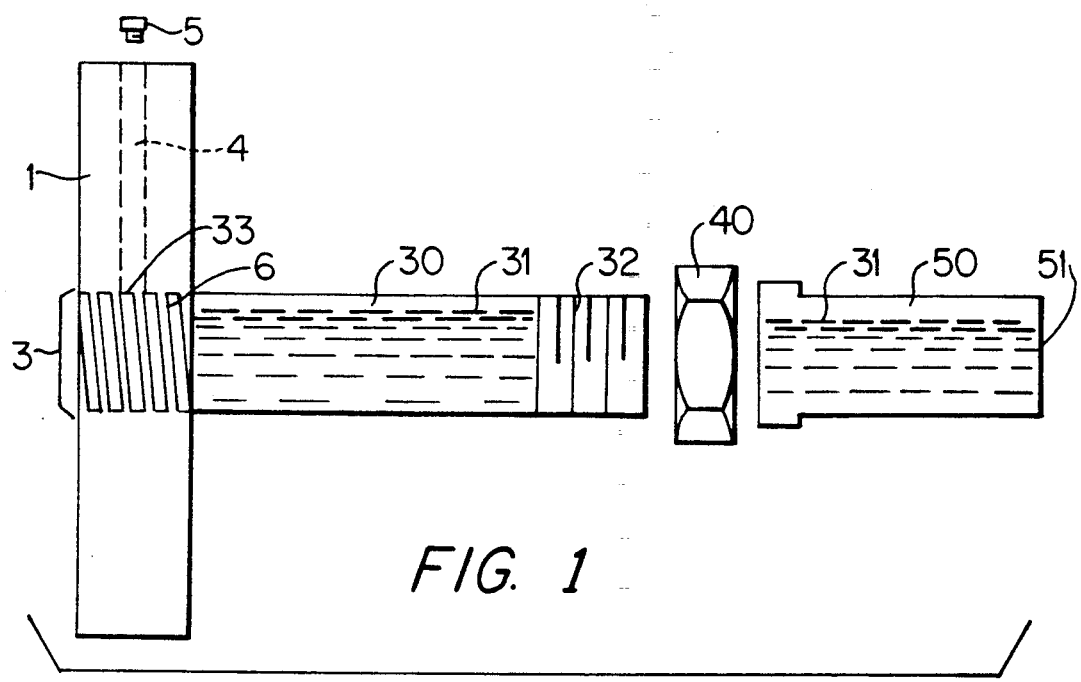
FIG. 1 represents a cross-sectional view of one embodiment of the present invention.
Figure 2:
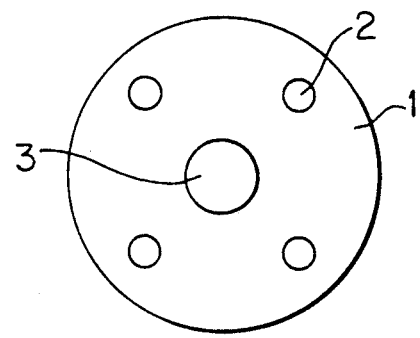
FIG. 2 represents a frontal view of the flange end of the present invention.
Figure 3:
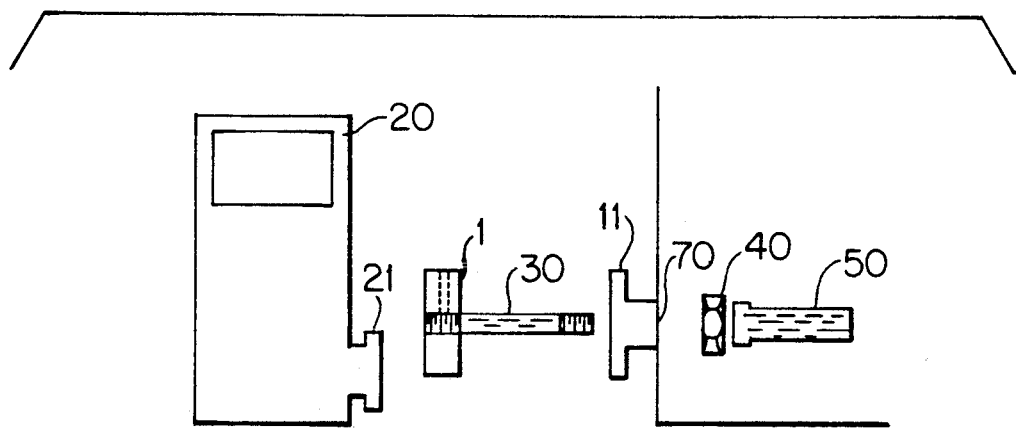
Figure 5:
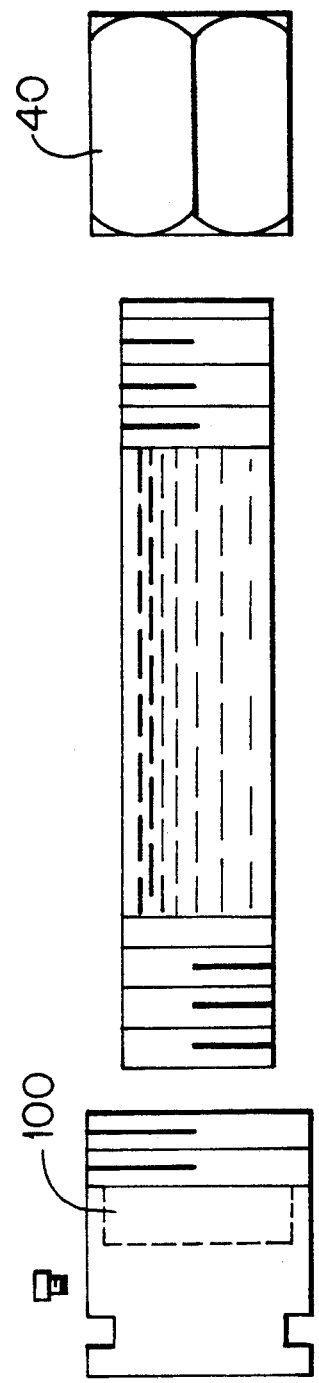
FIG. 5 represents a cross-sectional view of another embodiment of the present invention.

FIG. 1 shows a cross-sectional view of the elements of the present invention. The flange 1 provides means for attaching the present invention to a hole 70 in the tank 200 shown in FIG. 3. Holes 2 formed in the flange allow the flange, shown in a frontal view of FIG. 2, to be connected to the tank 200. A hole 3 formed in the flange 1 allows the flange to be connected to the head gauge 20, shown in FIG. 3. The flange and the first nipple may be connected, for example, with a threaded connection 6. Alternatively, the flange and the first nipple may be welded together. Other means of connection may be used. The first nipple may be connected to the bladder 50 with a nut 40 as shown in Fig. 1. As shown in FIG. 1 and FIG. 5, .the two nipples may be used, connected together by using threads 32 formed on the nipples. Other means may be used to connect the two nipples such as welding.

To facilitate the attachment of the head-gauge/tank-bladder, a fixture 11 is attached around the hole 70 in the tank 200. The shape of a fixture 11 can provide a surface with enough area to allow holes to be formed in it corresponding to the placement of holes formed in the flange. Bolts can then be inserted through the holes in the flange then into holes in the fixture. Nuts can be attached to the bolts to secure the flange. Alternatively, the flange may be secured to the fixture by other means such as welding. A second fixture 21 is attached to the head gauge 20 to allow the head gauge to be attached to the flange. The flange and head gauge may be secured to the receptacle using bolts or screws or other attachment means.

The first nipple 30 has a first end which is connected to the flange. To allow the first nipple to be secured to the flange, the first end is equipped, on its outside, with threads. Alternatively, the nipple is secured by welding or is a victraulic nipple. The flange opening 3 will be equipped similarly to the first nipple to allow the connection to be completed.

A liquid solution 31 is introduced and/or removed from the, interior of the first nipple and the bladder through an opening 4 in the head gauge. The liquid solution 31 may be of any composition which permits the efficient operation when using the present invention in a cold climate, the preferred embodiment will include a solution resistant to freezing.

When attaching the first nipple to the flange, proper alignment of the two pieces is necessary so that a passage 4 in the flange aligns with a passage 33 in the first nipple. This passage allows trapped air to be removed from the interior of the first nipple and the bladder. A plug 5 inserted into the passage 4 prevents the liquid from escaping from the device.

Figure 4:
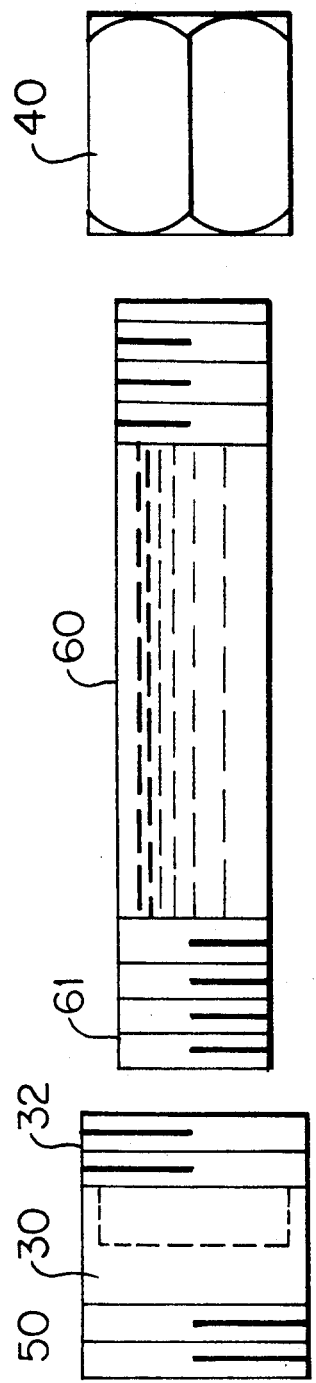
FIG. 4 represents a cross-sectional view of another embodiment of the present invention.

In the embodiment shown in FIG. 4, a first end 61 of a second nipple 60 is attached to a second end 32 of the first nipple. Attaching the second nipple to the first may be accomplished by using a variety of methods including threaded couplings or welding.

In this embodiment of the invention, a collar 100 is inserted into the second end 32 of the first nipple. The outside diameter of the collar 100 is slightly smaller than the inside diameter of the first nipple. Further, the inside diameter of the collar is slightly larger than the outside diameter of the second nipple.

To facilitate the attachment of the second nipple to the collar, the inside surface of the collar may be threaded with matching threads formed on the first end of the second nipple. Alternatively, the first and second nipples may be welded together following insertion of the first end of the first nipple into the collar. In another embodiment of the present invention head-gauge/tank-bladder, the first and second nipples are joined using a nut. Other known means for coupling two nipples, such as welding, may be used.

A second end of the second nipple is equipped with a threaded connection to allow bladder 50 to be joined to the second nipple.

The bladder 50 is molded from a flexible, petroleum, including oil and gas, and/or saltwater resistant material. Preferably, a flexible polyvinylchloride (PVC) is used, one example of which is Ultraprene 90-U606A-60 manufactured by Teknor Apex Co. A variety of other materials incorporating the above characteristics may alternatively be used. The bladder must be made of a material that will deform in response to the pressure of the liquid within the tank. When the tank is filled with liquid, the liquid pressure forces the sides of the bladder inward. The inside surface of the bladder then displaces the liquid within the nipples and bladder causing the pressure of the solution 31 to impact on the head gauge. The incompressibility of liquids ensures the gauge will accurately register the pressure from the liquid within the tank.

In a typical embodiment of the invention, the bladder is about 9.75 inches long, with walls about 5/32 of an inch thick, and with an outside diameter of about one inch. Such a length allows the bladder to operate with larger tanks.

The gauge 20 attached to the flange at the hole 3 can be any gauge capable of measuring hydrostatic pressure. The design and construction of the present invention allows for its attachment from outside the tank by simply cutting a hole in the tank, attaching the flange then inserting the nipple and bladder portion of the present invention into the tank leaving the gauge outside of the tank. The gauge is then secured to the flange as previously described. Thus the need for personnel to enter the tank to make any corrections or complete assembly of the present invention is eliminated.

The caustic nature of liquids which need to be stored as well as contaminants within those liquids can cause the gauge apparatus to deteriorate, corrode, or become clogged. By isolating the gauge from the liquid, the present invention maintains the gauge in an opened state. In one embodiment of the present invention, by incorporating a compound or compounds into the liquid, the freezing point of the liquid can be lowered to allow the gauge to provide accurate readings even when ambient temperature are extremely low.

Although the principles of the present invention have been described with reference to a particular embodiment, by way of example, it is understood that modifications may suggest themselves to those skilled in the art and it is intended that such modifications fall within the scope of the claims.

We claim:

1. A head-gauge/tank-bladder device for measuring the pressure of a liquid within a tank while isolating the head gauge from the liquid contained within the tank, said head-gauge/tank-bladder comprising:
   a head-gauge capable of measuring liquid
   a first nipple with a first end and a second end, the first end connected by a first coupling means to the head-gauge, the second end being inserted into the tank;
   a second nipple having a first end and a second end, the first end connected to the second end of the first nipple by a second coupling means;
   a bladder made of material having elastic characteristics attached to the second end of the second nipple by a third coupling means;
   a cavity defined by the two nipples and the bladder.

2. The head-gauge/tank-bladder device according to claims 1, wherein said first coupling means comprises a flange attached around a hole formed in the side of the tank, said flange attached to the first end of the first nipple, said flange comprising means to attach the flange to the tank and means to attach the gauge to the flange.

3. The head-gauge/tank-bladder device according to claim 2, wherein the means to attach the flange to the tank comprises a threaded connection with a cup shaped section substantially corresponding to the shape of the flange attached on the outside of the tank around the hole where the tube is inserted.

4. The head-gauge/tank-bladder device according to claim 3, wherein the means to connect the flange to the tank comprises bolts inserted through holes in the face of the flange and into the cup shaped section attached to the tank wall with nuts securing the bolts.

5. The head-gauge/tank-bladder device according to claim 2, wherein the flange further comprises means to remove air from the tubing, said means comprising a passage formed through the flange, extending into said tube.

6. The head-gauge/tank-bladder device according to claim 1 in which the cavity formed by the nipples and the bladder is filled with a liquid.

7. The head-gauge/tank-bladder device according to claim 5, wherein the liquid contained within the tube is composed of an antifreeze solution.

8. The head-gauge/tank-bladder device according to claim 6, wherein said liquid is introduced into said cavity through a hole in said head-gauge.

9. The head-gauge/tank-bladder device according to claim 1, wherein said material is a flexible petroleum resistant polyvinylchloride.

10. A head-gauge/tank-bladder device for measuring the pressure of a liquid within a tank while isolating the head gauge from the liquid contained within the tank comprising:
   a head-gauge capable of measuring liquid pressure;
   a first nipple with a first end and a second end, the first end connected by a first coupling means to the head-gauge, the second end being inserted into the tank;
   a bladder made of material having elastic characteristics attached to the second end of said nipple by a second coupling means;
   a cavity defined by the first nipple and the bladder.

11. The head-gauge/tank-bladder device according to claim 10, wherein said first coupling means comprises a flange attached around a hole formed in the side of the tank, said flange attached to said first end of the first nipple, said flange comprising means to attach the flange to the tank and means to attach the gauge to the flange.

12. The head-gauge/tank-bladder device according to claim 11, wherein the flange further comprises means to introduce and remove a liquid into and from the first nipple, said introducing and removing means comprising a passage formed through the flange, extending into said nipple.

13. The head-gauge/tank-bladder device according to claim 11, wherein the first nipple is connected to the flange and a first end of a second nipple is connected to the second end of the first nipple, with the bladder connected to a second end of the second nipple.

14. The head-gauge/tank-bladder device according to claim 11, wherein the means to attach the flange to the tank comprises a threaded connection with a cup shaped section substantially corresponding to the shape of the flange attached on the outside of the tank around the hole where the tube is inserted.

15. The head-gauge/tank-bladder device according to claim 14, wherein the means to connect the flange to the tank comprises bolts inserted through holes in the face of the flange and into the cup shaped section attached to the tank wall with nuts securing the bolts.

16. The head-gauge/tank-bladder device according to claim 10 in which the cavity formed by the first nipple and the first bladder is filled with a liquid.

17. The head-gauge/tank-bladder device according to claim 16, wherein said liquid is introduced into said cavity through a hole in said head-gauge.

18. The head-gauge/tank-bladder device according to claim 10, wherein the liquid contained within the nipple is composed of an antifreeze solution.

* * * * *